United States Patent [19]
Ferry et al.

[11] Patent Number: 5,303,114
[45] Date of Patent: Apr. 12, 1994

[54] OVERLOAD PROTECTION CIRCUIT CAPABLE OF SUSTAINING HIGH INRUSH CURENT IN THE LOAD CIRCUIT

[75] Inventors: Michel Ferry, Vallauris; Philippe Zeraffa, Nice, both of France

[73] Assignee: International Business Machines Corporation, Armonk, N.Y.

[21] Appl. No.: 942,872

[22] Filed: Sep. 10, 1992

[30] Foreign Application Priority Data

Nov. 15, 1991 [EP] European Pat. Off. ......... 91480170.9

[51] Int. Cl.⁵ ........................................... H02H 3/087
[52] U.S. Cl. ..................................... 361/101; 323/908
[58] Field of Search .................... 363/48, 49; 323/901, 323/908; 361/18, 58, 75, 63, 101

[56] References Cited

U.S. PATENT DOCUMENTS

| | | |
|---|---|---|
| 3,729,671 | 4/1973 | Jeffery . |
| 5,063,471 | 11/1991 | Park ..................... 361/18 |
| 5,187,653 | 2/1993 | Lorenz ................... 363/89 |

FOREIGN PATENT DOCUMENTS

| | | | |
|---|---|---|---|
| 0272514 | 12/1987 | European Pat. Off. ....... H02H 9/00 |
| 3421520 | 6/1984 | Fed. Rep. of Germany ......... H02H 7/12 |
| 4013731 | 4/1990 | Fed. Rep. of Germany ......... H02H 9/02 |

OTHER PUBLICATIONS

IBM Technical Disclosure Bulletin, vol. 32, No. 5B, Oct. 1989, p. 407 "Slow Start Circuit".

Primary Examiner—William H. Beha, Jr.
Attorney, Agent, or Firm—Joscelyn G. Cockburn

[57] ABSTRACT

This overload protection circuit capable of sustaining high capacitive load or any other load which may create an important inrush current, comprises a differential bridge composed of high impedance measuring resistors (R1, R1' R3, R3'), a low impedance sensing resistor (R2), and a timing and control circuit (20) including a transistor (T2), a capacitor (C1) and resistors that controls a switch (T1) and limits the inrush current of the subcircuit capacitor by slowing the closing of the switch. In case of defaults, the switch will be opened fast enough to minimize the fault transient transfer from down-stream to up-stream of the protection circuit. In addition, a comparator (32) associated to a resistor (R31) providing an hysteresis enables to avoid the oscillations in the region of the system transition from on to off states and vice versa. This circuit can be used in a system which comprises a secondary power supply unit (9) which powers a plurality of subcircuits (22).

10 Claims, 4 Drawing Sheets

OVERLOAD PROTECTION CIRCUIT(14)
WITH A POSITIVE SUPPLY VOLTAGE

FUNCTIONAL SCHEMATICS OF THE OVERLOAD PROTECTION CIRCUIT

OVERLOAD PROTECTION CIRCUIT (14)
WITH A POSITIVE SUPPLY VOLTAGE

OVERLOAD PROTECTION CIRCUIT(14)
WITH A NEGATIVE SUPPLY VOLTAGE

OVERLOAD PROTECTION CIRCUIT CAPABLE OF SUSTAINING HIGH INRUSH CURENT IN THE LOAD CIRCUIT

DESCRIPTION OF THE INVENTION

1. Field of the Invention

The present invention relates to an overload protection circuit which can be used for protecting independent subcircuits presenting a high inrush current against short circuits or overcurrents, and more particularly to a circuit which has a slow turn on that limits the inrush current in the load circuit and which also has a fast trip.

2. Background Art

Many electronic circuits for protecting devices against overloads due to short-circuits or overcurrents already exist. No such circuit solves the problems that encounters a system comprising a central primary power supply unit which powers a plurality of subcircuits. Indeed, the defaults that appear in any one of the subcircuits should not impair the operations of the other devices. One may implement an overload protection circuit inside the central power supply as well as upstream a group of subcircuits, but one must acknowledge that the functions performed by both protection circuits which are distant from each other are not equivalent.

In the unpublished EP application 90480130.5, the circuit comprising a negligible internal resistance can be used to protect devices powered from a unique remote prime power unit with all the advantages which result from that improved circuit. But that invention does not have to solve the problems that occur when the devices to be protected have a high inrush current due to the high capacitive load. In the patent DE-A-3421520, the overload protection circuit comprises a differential resistor bridge and a sensing resistor which detects the direct current overload. The comparator implemented gives a warning signal when the voltage exceeds a maximum or a minimum value. But the implementation does not resolve the problem in case of high capacitive load. Moreover, the regulator does dissipate much more energy, and it does not perform the same functions as the switch, whose closing should be slow and whose opening must be as fast as possible.

The circuit of a "stabilized power supply" shown in the publication "Electronique et modelisation ferroviaire" by Jean-Luc Tissot, uses a capacitor mounted in parallel with a resistance to sustain high capacitive loads, but the duration of the closing and opening of the transistor serially mounted cannot be variable. Thereafter, at initial plugging, the subcircuits may have a high capacitive load and the closing of the transistor will not be slow enough to enable the capacitor to prevent the overload protection circuit to be triggered off again.

Indeed, high capacitance load may behave as a short circuit in two main instances if no action is taken against this phenomenon:
at the initial plugging of the subcircuits, and
when the circuit is reactivated after it has been triggered open by an overload.

SUMMARY OF THE INVENTION

Therefore, an object of the present invention is to provide an overload protection circuit which accepts high values decoupling capacitance of the subcircuits thanks to the inherent inrush current limitation of said circuit.

Another object of the invention is to minimize the transfer of transients from down-stream to up-stream of the protection when defaults appear in one of the subcircuits.

Another more object of the present invention is to provide an overload protection circuit which has a low internal impedance comparable to the internal resistance of the local secondary power supply.

Another further object is to provide an overload protection circuit which could be restarted owing to an external command, no matter the default which has caused the break up of the overload protection circuit has disappeared or not.

The overload protection circuit according to the present invention comprises:
  a switching means having a close or open status controlled by a closing or opening signal provided on its control input;
  an overload detecting means composed of a first resistor bridge having two legs of resistors connected in parallel between the supply voltage and a reference voltage (ground) and a first and second output terminals and generating a fixed voltage on the first output terminal and a variable voltage which depends on the load current value on the second output terminal.

The protection circuit is characterized in that it comprises:
  (a) a comparator having first and second inputs respectively connected to the first and second output terminals of said resistor bridge, and an output connected to the second input through a resistor, said comparator providing on its output a control signal which commands the closing and opening of said switching means;
  (b) a timing and control means for controlling the open and close status of said switching means comprising:
    first means activated when the switching means is in its open status for generating a closing control signal on the control input of said switching means for slowing down its closing;
    second means responsive to the output signal of the comparator for generating an opening control signal on the control input of the switching means for accelerating its opening;
  (c) said switching means has an input receiving the supply current, an output connected to the device and a control input responsive to the control signal on the output of said timing and control means for closing and opening said switching means.

DETAILED DESCRIPTION OF THE INVENTION

Figure 1:
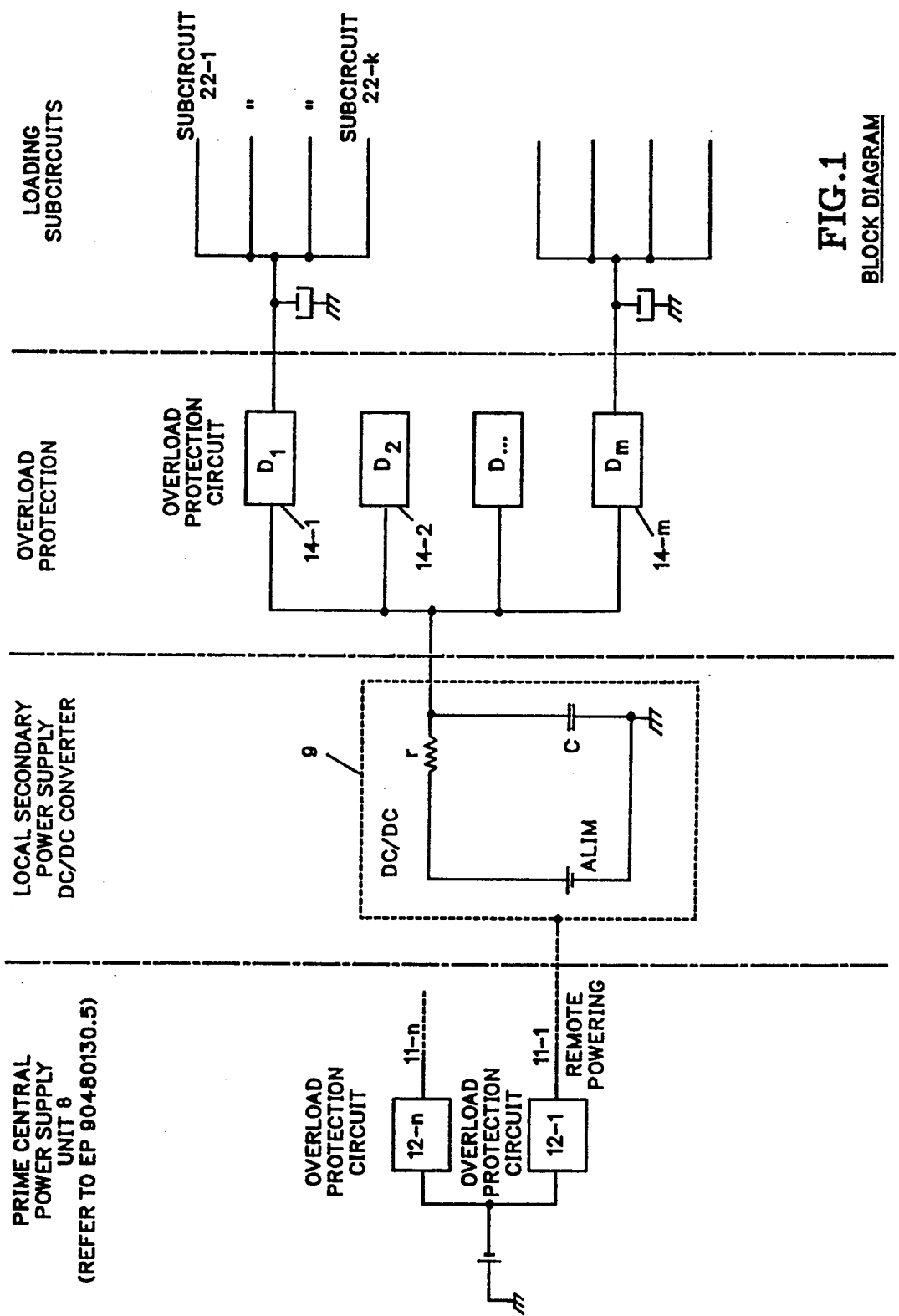
FIG. 1 shows the block diagram of a system wherein the circuit according to the present invention may be implemented.

FIG. 1 represents a block diagram in which the circuit according to the present invention may be implemented. This environment is only shown for the sake of illustration and it will be obvious for the man skilled in the art to implement the overload protection circuit in any other system from the description of the present overload protection circuit.

The central power supply unit (8) powers a plurality of remote devices through lines (11-1 to 11-n) which may reach 100 meters long. Each remote device comprises a power supply DC/DC converter (9) in its own components in order to power a plurality of subcircuits (22-1 to 22-k) through a plurality of overload protection circuits (14-1 to 14-m), where an overload protection circuit (14) is connected to a plurality of subcircuits. Those subcircuits (22) represent the load circuits.

The power supply DC/DC converter (9) comprising an internal resistance and capacitance is schematically shown in this figure. The busses carrying the control and information signals are not represented because these signals are specific to the system and do not interact with the operation of the overload protection circuit of the present invention.

Figure 2:
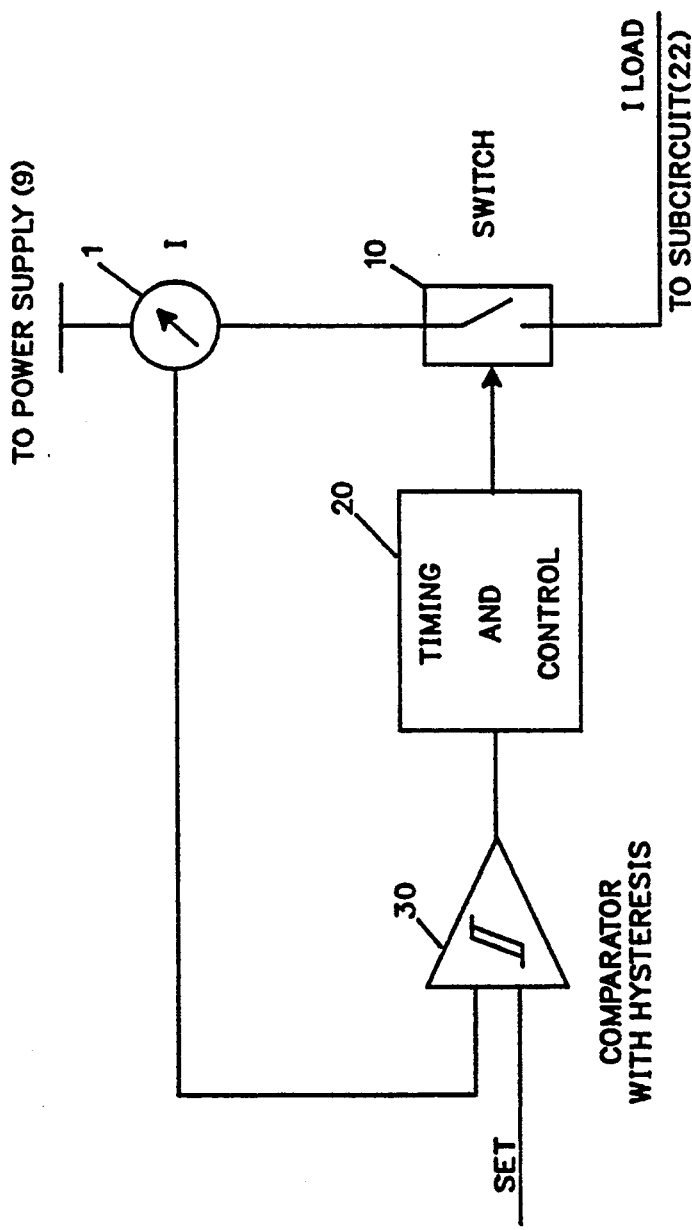
FIG. 2 shows the functional schematic of the overload protection circuit.

FIG. 2 represents the functional schematic of the circuit according to the present invention.

It comprises four elementary circuits which are in the boxes (1, 10, 20, 30) and which perform the following functions:
- box (1) is used for detecting and evaluating the overload current;
- box (10) is used for switching and loading a current to the load circuits (22);
- box (20) is used for timing and controlling the switch during its opening and closing;
- box (30) is used for opening the switch (10) in case of overload or for closing it in response to an external SET signal and for protecting the circuit against transition oscillations.

Figure 3:
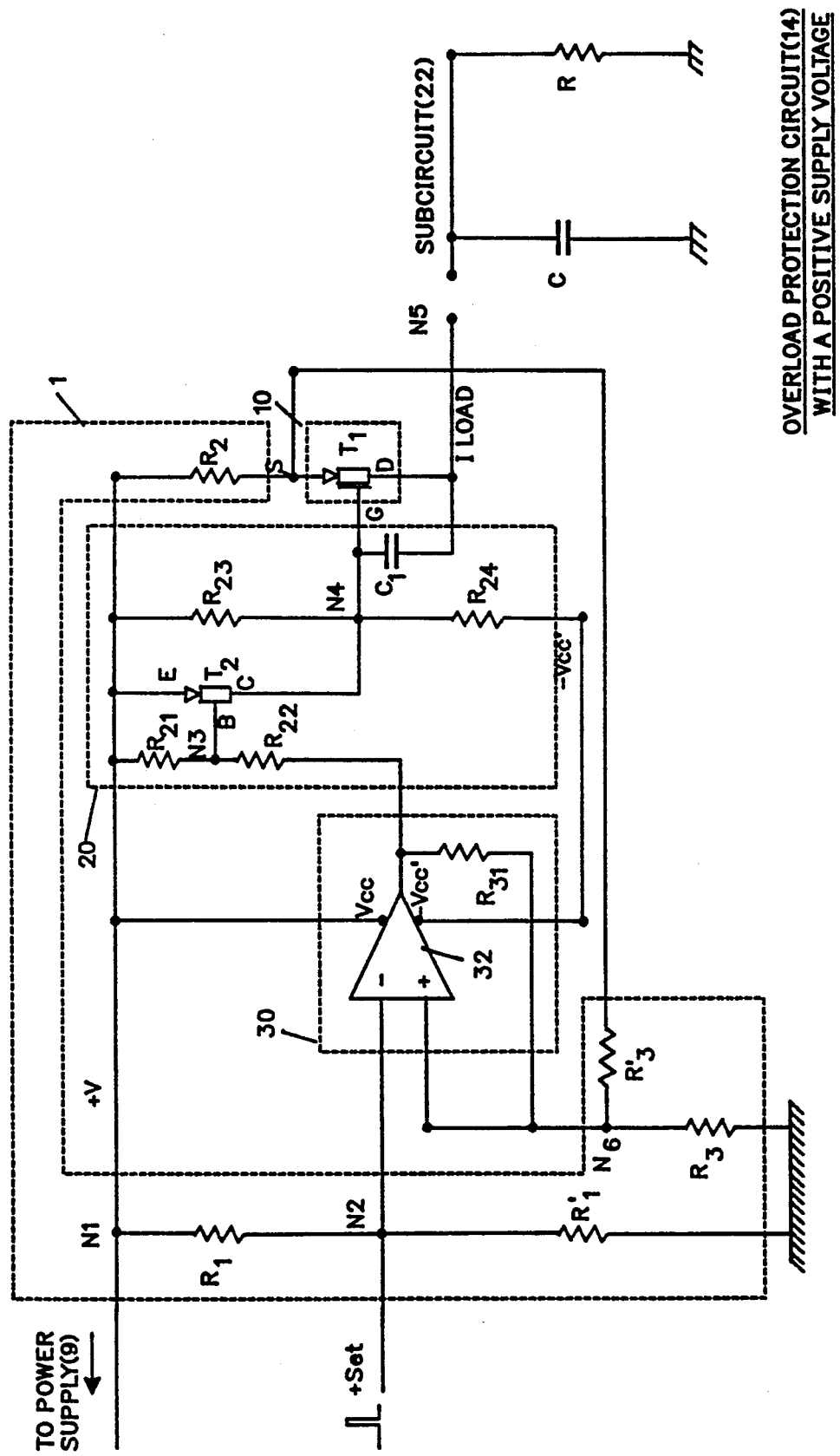
FIG. 3 represents a detailed schematic of the circuit according to the present invention when the supply voltage is positive.

The overload protection circuit (14) for any group of subcircuits (22), according to the present invention is shown in FIG. 3, in case the power supply (9) generates at node N1 a positive voltage +V which is in this case equal to +5 Volt.

In this implementation:
- box (1) comprises resistors R1, R1', R2 and R3, R3' that perform the measurement of the overload current to be detected;
- box (10) comprises a switch T1;
- box (20) comprises a transistor T2, a capacitor C1 and resistors R21, R22, R23, R24;
- box (30) comprises a comparator (32) and a resistor R31.

Resistors R1 and R1' are serially mounted between node N1 and the ground. The common point N2 of both resistors (R1 and R1') is connected to the minus input of comparator (32). The plus input of comparator (32) is connected to the ground through a resistor R3, and it is also connected to its output through a resistor R31. The external SET signal is also connected to the minus input of the comparator (32). The voltage supply of the comparator (32) is given by a couple of values (Vcc, −Vcc'), where in the present implementation Vcc = +5 volt and −Vcc' = −10 volt. Those values will influence the values of resistor R23 and R24 that will be given later on.

Two other resistors R21 and R22 are serially mounted between node N1 and the output of comparator (32), both resistors have a common point N3.

Resistors R23 and R24 are also serially mounted between node N1 and the negative voltage supply Vcc', both resistors have a common point N4.

The transistor T2 shown in box (20) represents a junction transistor which has a very low resistance when closed. The emitter connection (E) of the Transistor T2 and the base connection (B) are respectively connected to N1 and N3, the collector connection (C) is connected to N4.

In a preferred embodiment of the invention, the switch T1 in box (10) comprises a field effect transistor (FET) which presents a very low resistance when closed. In the circuit shown in this FIG. 3, T1 is of the P enhancement type. The gate connection (G) is connected to the node N4, the source connection (S) to the node N1 through a resistor R2, and a capacitor C1 is connected between the gate (G) and drain (D) connections. The drain connection is directly connected to the node N5 which loads a current (I load) to the group of subcircuits (22).

Two resistors R3 and R3' are serially mounted between the source connection of T1 and the ground, both resistors have a common point N6 which is connected to the plus input of the comparator (32).

In this FIG. 3 one may represent the loading subcircuit by a capacitor C and a resistor R mounted in parallel, and connected between the node N5 and the ground.

The purposes of the implementation of the circuit shown in FIG. 3 are:

At initial loading as at self restart after the demise of a default, a capacitance loading creates a short-circuit which breaks the overload protection if the appropriated actions are not taken against this phenomenon.

Thereafter, it comes up at first glance that one could force the restart command long enough so that the capacitor C of the subcircuit (22) has time to load to have its inrush current disappeared. However, this is contradicting to the fact that one must also reduce the retry time of a restart during a permanent default, to minimize the fault transient transfer from downstream to upstream of the protection circuit.

Therefore, the solution is to get the retry time which should be as short as possible, but slightly longer than the response time of the comparator (32). Consequently, one can slow down the closing of the transistor T1 by implementing two resistors R23 and R24 upstream the gate connection (G). Those resistors will command the transistor T1 and limit the charge of capacitor C1 implemented between the gate (G) and drain (D) connections of T1.

The operation of the circuit in this instance will be easily understood in the case the subcircuit load (22) is purely capacitive and equal to C. The basic assumption is that during the charge up phase of the capacitor C, the current through capacitor C is much higher than the current through capacitor C1. The current supplied by T1 will tend to raise the voltage across the capacitor C. This voltage raise will tend to discharge C1 while resistors R23 and R24 together will tend to charge it. As a consequence, the voltage on the gate of T1 will reach an equilibrium and remain constant. The control voltage of T1 remaining constant, the current delivered to C by T1 will also remain constant.

The circuit shown in FIG. 3 operates as follow:

When there is an overload, the current I load increases, which makes the voltage Vs on the source connection of T1 decrease and consequently the plus input voltage e+ of the comparator (32). Therefore, e+ < e− and the output of comparator (32) will also drop. T2 is immediately saturated and it triggers the switch T1 off very fast by instant discharge of Cl.

On the opposite, when T1 has been opened, a SET signal is applied to the comparator to make e− decrease until e− < e+. Thereafter, the output voltage of the comparator increases, which triggers transistor T2 off. T2 is opened and T1 is smoothly closed through the charge of capacitor Cl and resistors R23, R24.

One may obtain this result thanks to the values of R21 and R22, where R21 is a leakage resistor which enables not to trigger the transistor T2 on a leakage current from comparator (32), and where R22 sets T2 base current when the comparator is on −Vcc′ which is equal to −10 volt in this implementation.

Moreover, to avoid the appearance of oscillations in the region of the system transition from on to off state and vice versa, an hysteresis is implemented between the output and the plus input of the comparator (32) by using a resistor R31 in box (30).

In a preferred embodiment of the invention the resistors and the capacitor have the following values:

R1 = 2.05 Kiloohms, R1′ = 4.99 Kiloohms;
R3 = 49.9 Kiloohms, R3′ = 20.5 Kiloohms;
R21 = 15 Kiloohms, R22 = 10 Kiloohms;
R23 = 360 Kiloohms, R24 = 180 Kiloohms;
R2 = 0.3 ohm, C1 = 33 nF;
R31 = 180 Kiloohms.

Figure 4:
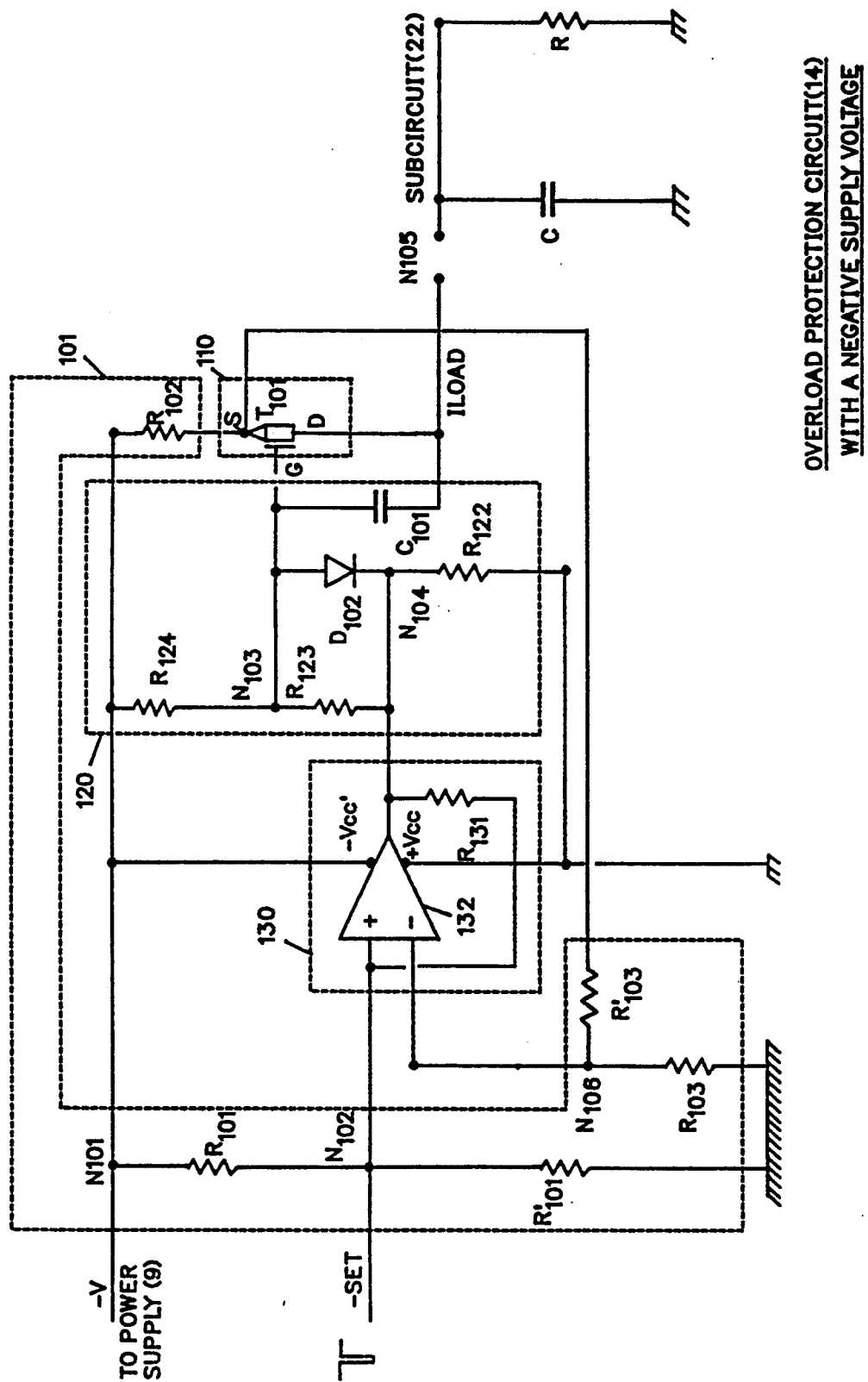
FIG. 4 represents a detailed schematic of the circuit according to the present invention when the supply voltage is negative.

FIG. 4 represents the overload protection circuit when implemented to protect a group of subcircuits operating with a negative supply voltage −V generated at node N101 by a secondary power supply (9). In the implementation shown, the voltage −V is equal to −20 volt.

The components of the circuit are referenced by the reference numbers of FIG. 3 added to 100, i.e. comparator (132) in FIG. 4 has the same function as comparator (32) in FIG. 3. It is exactly the same for the resistors R101, R101′, R103, R103′, R102, R122, R123, R124, and R131 in FIG. 4 which have the same functions as described before in FIG. 3.

The functions of the different boxes (101, 110, 120, 130) in the circuit shown in FIG. 4 are approximately similar to the functions of boxes (1, 10, 20, 30) in FIG. 3. There are few differences:

In box (110), the switch T101 which is a FET transistor of the N enhancement type, is controlled by three resistors R122, R123 and R124 in order to slow down the closing.

In box (120), the transistor T2 of FIG. 3 is replaced by a diode (102) which is implemented between node N103 and N104 enabling the current to flow from N103 to N104 in order to discharge immediately C101 through the low impedance output of comparator (132).

In box (130), the comparator (132) has its plus input connected to the node N102, whereas the minus input is connected to the node 106. The hysteresis circuit is implemented by the resistor R131 which connects the output of the comparator (132) to its plus input.

In a preferred embodiment of the invention the resistors and the capacitor have the following values:

R101 = 5 Kiloohms, R101′ = 5 Kiloohms;
R103 = 5 Kiloohms, R103′ = 5 Kiloohms;
R124 = 100 Kiloohms, R123 = 100 Kiloohms;
R122 = 15.8 Kiloohms;
R102 = 1.7 ohm, C101 = 33 nF;
R131 = 17.8 Kiloohms.

We claim:

1. An overload protection circuit for protecting a device (22) having a high inrush current powered from a power supply means (9) providing to the device a limited inrush current (I load) and a supply voltage (V), including:

a switching means (10) having a close or open status controlled by a closing or opening signal provided on its control input;

an overload detecting means (1) composed of a first resistor bridge (R1, R1′, R2, R3, R3′) having two legs of resistors (R1, R1′) and (R2′, R3, R3′) connected in parallel between the supply voltage (V) and a reference voltage (ground) and a first and second output terminals (N2, N6) which are respectively the common points of resistors (R1, R1′) and resistors (R3, R3′), and generating a fixed voltage on the first output terminal (N2) and a variable voltage which depends on the load current value on the second output terminal (N6);

said protection circuit characterized in that it comprises:

(a) a comparator (32) having first and second inputs respectively connected to the first and second output terminals of said first resistor bridge, and an output providing on its output a control signal;

(b) means (R31 or R131) for implementing hysteresis to avoid the oscillations in the region of the system transition from on to off states and vice-versa;

(c) a timing and control means (20) for controlling the close and open status of said switching means (10) comprising:

first means responsive to the output signal of the comparator (32) for generating a closing control signal on the control input of said switching means (10) for slowing down its closing;

second means responsive to the output signal of the comparator (32) for generating an opening control signal on the control input of the switching means (10) for accelerating its opening;

(d) said switching means (10) has an input receiving the supply current, an output connected to the device (22) and a control input responsive to the control signal on the output of said timing and control means (20) for closing and opening the switching means (10).

2. The overload protection circuit according to claim 1 characterized in that said switching means (10) comprises a field effect transistor whose first electrode receives the supply current, second electrode is connected to the device (22) and the gate electrode is the control input.

3. The overload protection circuit according to claim 1 characterized in that said means (R31 or R131) for providing hysteresis comprises a resistor implemented between the second input and the output of said said comparator (32).

4. The overload protection circuit according to claim 2 characterized in that said first means comprises a second resistor bridge (R23, R24) and a capacitor (C1).

5. The overload protection circuit according to claim 2 characterized in that said second means comprises a third resistor bridge (R21, R22) serially mounted between the supply voltage (V) and the output of said comparator (32) and a transistor (T2) whose emitter and base are respectively connected to the supply voltage (V) and the middle point of said resistors (R21, R22), and whose collector is connected to the gate electrode of the field effect transistor of said switching means (10) so that said transistor (T2) is immediately saturated at the output signal of said comparator (32) to open said switching means (10).

6. The overload protection circuit according to claims 2, 3, 4 or 5 characterized in that the supply voltage is positive with respect to the reference voltage and in that said field effect transistor (T1) is of the P enhancement type.

7. The overload protection circuit according to claim 2 characterized in that said first means comprises a fourth resistor bridge (R122, R123, R124) and a capacitor (C101).

8. The overload protection circuit according to claim 2 characterized in that said second means comprises a diode (D102) which is mounted between the gate of the field effect transistor of said switching means (110) and the output of said comparator (132) in order to be immediately conductive to open said switching means (110).

9. The overload protection circuit according to claims 2, 7 or 8 characterized in that the supply voltage is negative with respect to the reference voltage and in that said field effect transistor (T101) is of the N enhancement type.

10. A system comprising a central power supply means (9) which powers a plurality of devices (22) characterized in that each device (22) is protected against overloads by an overload protection circuit according to any one of claims 1 to 5.

* * * * *